US008897421B2

(12) United States Patent
Smith

(10) Patent No.: US 8,897,421 B2
(45) Date of Patent: *Nov. 25, 2014

(54) SYSTEM AND METHOD FOR PROVIDING TELEPHONE ASSIGNMENT INFORMATION TO TELEPHONE SERVICE TECHNICIANS

(75) Inventor: Wendell J. Smith, Olathe, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 66 days.

This patent is subject to a terminal disclaimer.

(21) Appl. No.: 13/593,877

(22) Filed: Aug. 24, 2012

(65) Prior Publication Data

US 2013/0010938 A1 Jan. 10, 2013

Related U.S. Application Data

(63) Continuation of application No. 12/325,885, filed on Dec. 1, 2008, now Pat. No. 8,275,095.

(51) Int. Cl.
*H04M 1/24* (2006.01)
*H04M 3/493* (2006.01)
*H04M 3/22* (2006.01)
*H04M 3/42* (2006.01)

(52) U.S. Cl.
CPC .......... *H04M 3/493* (2013.01); *H04M 2201/39* (2013.01); *H04M 3/229* (2013.01); *H04M 3/42059* (2013.01)
USPC ...................................... 379/9.03; 379/27.01

(58) Field of Classification Search
USPC .................................. 379/9.03, 27.01–27.08
See application file for complete search history.

(56) References Cited

U.S. PATENT DOCUMENTS

| 4,774,721 | A | * | 9/1988 | Gift et al. .................... 379/27.01 |
| 5,812,934 | A | | 9/1998 | Hard et al. |
| 5,920,846 | A | * | 7/1999 | Storch et al. ................. 705/7.14 |
| 6,788,765 | B1 | | 9/2004 | Beamon |
| 7,130,399 | B1 | | 10/2006 | Jean et al. |
| 7,463,730 | B2 | | 12/2008 | Katkam et al. |
| 8,275,095 | B2 | | 9/2012 | Smith |
| 2010/0135474 | A1 | | 6/2010 | Smith |

OTHER PUBLICATIONS

U.S. Appl. No. 12/325,885; Non-Final Office Action dated Jan. 25, 2012; 8 pages.
U.S. Appl. No. 12/325,885; Notice of Allowance dated May 25, 2012; 11 pages.
U.S. Appl. No. 12/325,885; Issue Notification dated Sep. 6, 2012; 2 pages.

* cited by examiner

*Primary Examiner* — Simon Sing
(74) *Attorney, Agent, or Firm* — Swanson & Bratschun, L.L.C.

(57) ABSTRACT

A system and method for telephone service technicians to retrieve telephone line assignment information, including receiving a telephone call from a telephone service technician. A telephone number assigned to a customer of a communications carrier may be received, where the telephone number is associated with a telephone operating on a wired communications network, such as the public switched telephone network (PSTN). Telephone line assignment information may be requested, where the telephone line assignment information includes cable and line pair information. The telephone line assignment information may be converted into speech synthesized audible signals and communicated to the telephone service technician during the telephone call. The conversion of the telephone line assignment information may be performed by an interactive voice response system.

20 Claims, 16 Drawing Sheets

SYSTEM AND METHOD FOR PROVIDING TELEPHONE ASSIGNMENT INFORMATION TO TELEPHONE SERVICE TECHNICIANS

CROSS REFERENCE TO RELATED APPLICATION

This application is a continuation of U.S. patent application Ser. No. 12/325,885, filed Dec. 1, 2008 by Wendell J. Smith and entitled, "System and Method for Providing Telephone Assignment Information to Telephone Service Technicians," which is hereby incorporated by reference in its entirety.

BACKGROUND

Telephone service technicians correct problems along telephone lines, whether on telephone poles, in splice pits, in manholes, or at customer premises. Oftentimes, telephone service technicians have a need to find out telephone line assignment information to determine how to repair or otherwise correct a problem on the telephone lines to which a customer telephone is or should be connected. The telephone line assignment information typically includes cable, pair, and terminal, as well as telephone number, customer information, etc.

To assist telephone service technicians in making repairs, telecommunication service providers provide a couple of options for the telephone service technicians to access the telephone line assignment information, including call centers and websites. Call centers allow the telephone service technicians to call up a call center service operator to provide telephone line assignment information while on a job site. However, as well understood by telephone service technicians, the call centers can be congested and take up to 15 minutes to reach a call center service operator, which is highly inefficient, both in time and labor costs, and frustrating when the telephone service technician is operating on a pole, in a manhole, or during inclement weather. It is estimated that approximately 48 percent (440,000 calls) of calls made to the call centers are related to facilities charges and calls for information. Of this total, approximately 25 percent (110,000) of the calls are from telephone service technicians.

A website allows the telephone service technicians to more quickly access the telephone line assignment information via a laptop computer with wireless access. However, laptop computers are not always possible to use when working outdoors, in dirty environments, or confined spaces.

SUMMARY

To overcome the problems for telephone service technicians in accessing telephone line assignment information, the principles of the present invention provide for an interactive voice response (IVR) system to enable telephone service technicians to remotely access telephone line equipment information using a telephone test set or mobile telephone, thereby reducing time and providing freedom to the telephone service technicians when accessing the telephone line equipment. The IVR may enable the telephone service technician to use a telephone test set connected to a customer telephone line or a mobile telephone. By providing the IVR, telephone service technicians can access the telephone line assignment information from virtually any job repair site and receive the information with minimal delay, thereby improving efficiency and reducing costs.

A system and method for telephone service technicians to retrieve telephone line assignment information, including receiving a telephone call from a telephone service technician. A telephone number assigned to a customer of a communications carrier may be received, where the telephone number is associated with a telephone operating on a wired communications network, such as the public switched telephone network (PSTN). Telephone line assignment information may be requested, where the telephone line assignment information includes cable and line pair information. The telephone line assignment information may be converted into speech synthesized audible signals and communicated to the telephone service technician during the telephone call. The conversion of the telephone line assignment information may be performed by an interactive voice response system.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
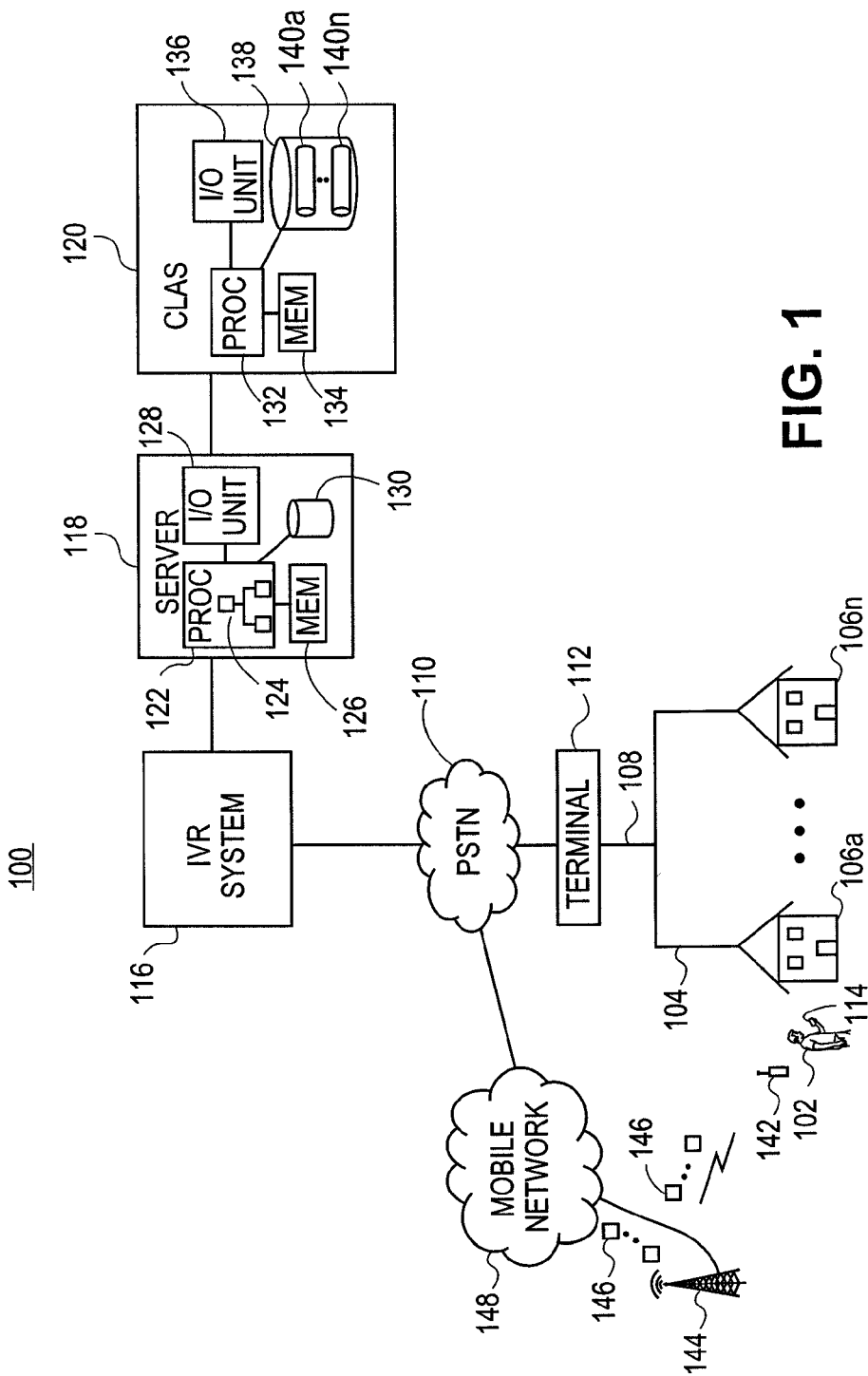
FIG. 1 is an illustration of an illustrative network environment in which telephone service technicians operate to repair telephone lines of customers.

With regard to FIG. 1, an illustrative network environment 100 is shown to include a telephone service technician 102 working to repair a telephone line 104 to which a customer living in one of multiple residences 106*a*-106*n* (collectively 106) is connected. As understood in the art, the telephone line 104 is generally understood to be a pair of wires or twisted pair distributed to the residences 106 via cable or line pairs 108 that may be formed of hundreds or thousands of pairs of wires for connecting the residences 106 to the public switched telephone network (PSTN) 110. As understood in the art, a terminal 112 from among a number of terminals may be used to manage telephone communications to and from the residences 106 being served by a telecommunication service provider.

In accordance with the principles of the present invention, the telephone service technician 102 may utilize a telephone test set 114 with connection devices, such as alligator clips, to connect onto the line pair 108 to test operation thereof. In one embodiment, the telephone service technician 102 may utilize the telephone test set 114 to call an interactive voice response system 116. The IVR system 116 may be configured to enable the telephone service technician 102 to interact with a server 118 that controls communications with a customer loop assignment system (CLAS) 120, which stored customer telephone line assignment information, as understood in the art.

The server 118 may include a processing unit 122 that executes software 124 that interacts with the IVR system 116.

The software 124 may further be configured to interact with the customer loop assignment system 120 to access customer data stored thereat. The processing unit 122 may be in communication with a memory 126, input/output (I/O) unit 128, and storage unit 130. The memory 126 may store data and software 124 while the processing unit 122 is executing the software 124 to process the data. The I/O unit 128 may be configured to communicate with the IVR system 116 and customer loop assignment system 120 utilizing one or more communications protocols, such as an MQ Series and IMS connect framework communications protocols. In one embodiment, the server 118 communicates with the IVR system 116 and customer loop assignment system 120 via one or more networks, such as the Internet. It should further be understood that the functionality of the IVR system 116 and server 118 may be incorporated into the same computing system for performing the principles of the present invention.

The customer loop assignment system 120 may be configured with a processing unit 132 that communicates with a memory 134, I/O unit 136, and storage unit 138. The storage unit 138 may store one or more data repositories 140a-140n (collectively 140) for storing customer and network information, including telephone line assignment information. The processing unit 132 may be configured to manage the telephone line assignment information stored in the data repositories 140 and be responsive to requests from the server 118 for telephone line assignment and network information of customers. TABLE 1 illustrates customer and network information stored by the customer loop assignment system 120.

TABLE I

| Telephone Number | Cable | Line Pair | Terminal | Central Office Line Equipment |
|---|---|---|---|---|
| (214) 405-1234 | 32 | 208 | 16 | HOST 01 1 01 21 |
| (972) 635-1234 | 17 | 42 | 12 | HOST 01 2 02 12 |
| ... | ... | ... | ... | ... |

Continuing with FIG. 1, rather than the telephone service technician 102 using a telephone test set 114, the telephone service technician 102 may alternatively use a mobile telephone 142 to communicate with the IVR system 116. If using the mobile telephone 142, dual-tone multiple frequency (DTMF) signals may be communicated via a local mobile tower 144 that communicates data packets 146 over a mobile network 148 to the PSTN 110 for communication to the IVR system 116. Because the mobile telephone 142 is not connected to the telephone line 104, the telephone service technician 102 communicates a telephone number of the customer by speaking or typing the customer telephone number on the mobile telephone in response to the IVR system 116 requesting the telephone number of the customer.

Figure 2:
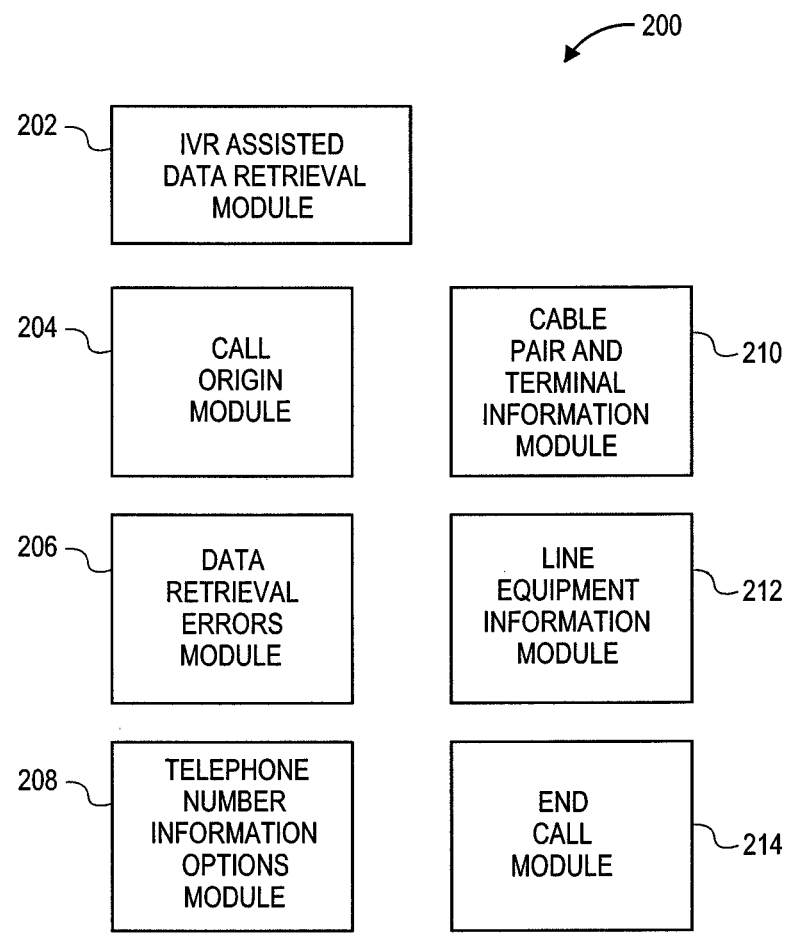
FIG. 2 is a block diagram of illustrative software modules configured to enable a telephone service technician to access telephone line assignment information of a telecommunication service provider.
Figure 3A:
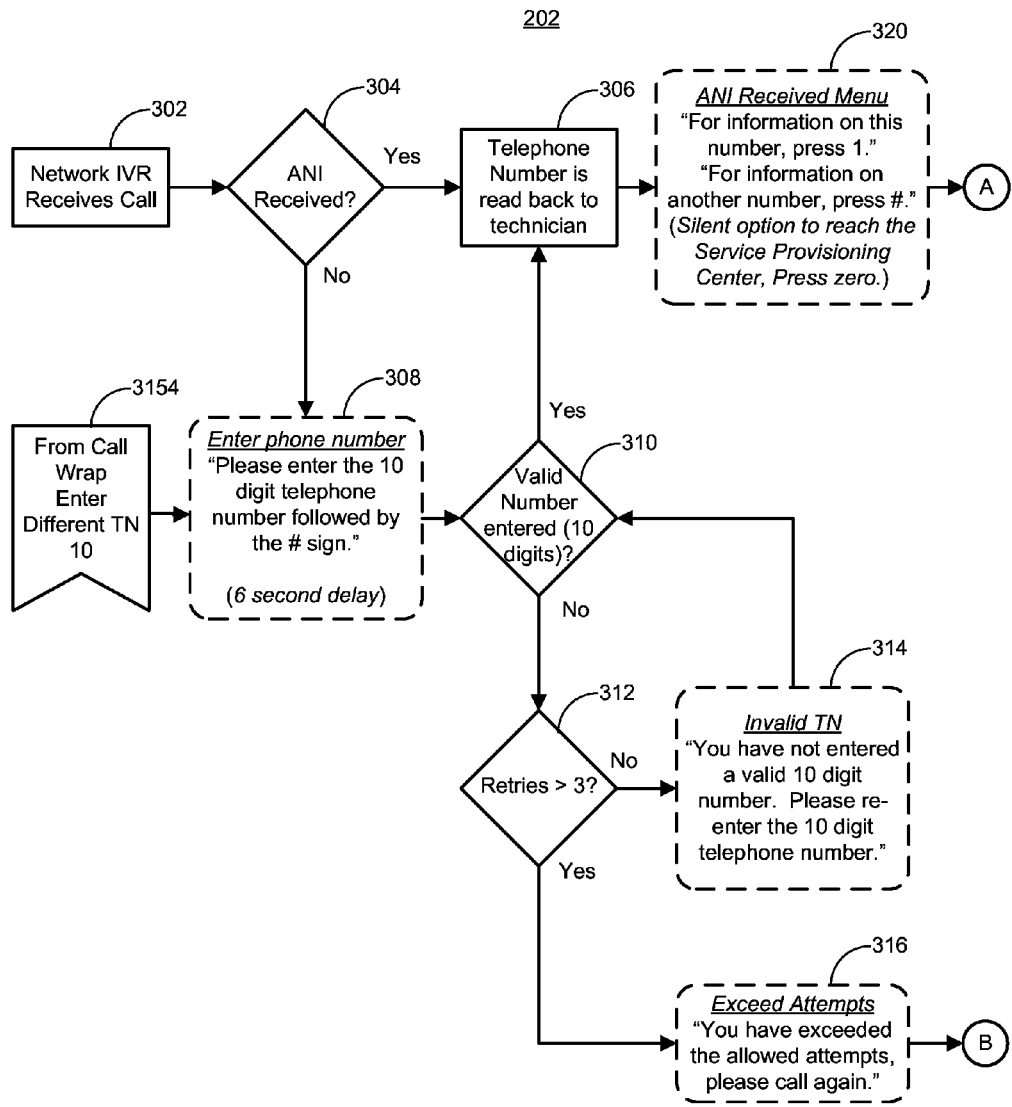
FIGS. 3A-3G are flow diagrams of illustrative processes for providing IVR access to telephone line assignment information for telephone service technicians.
Figure 3A:
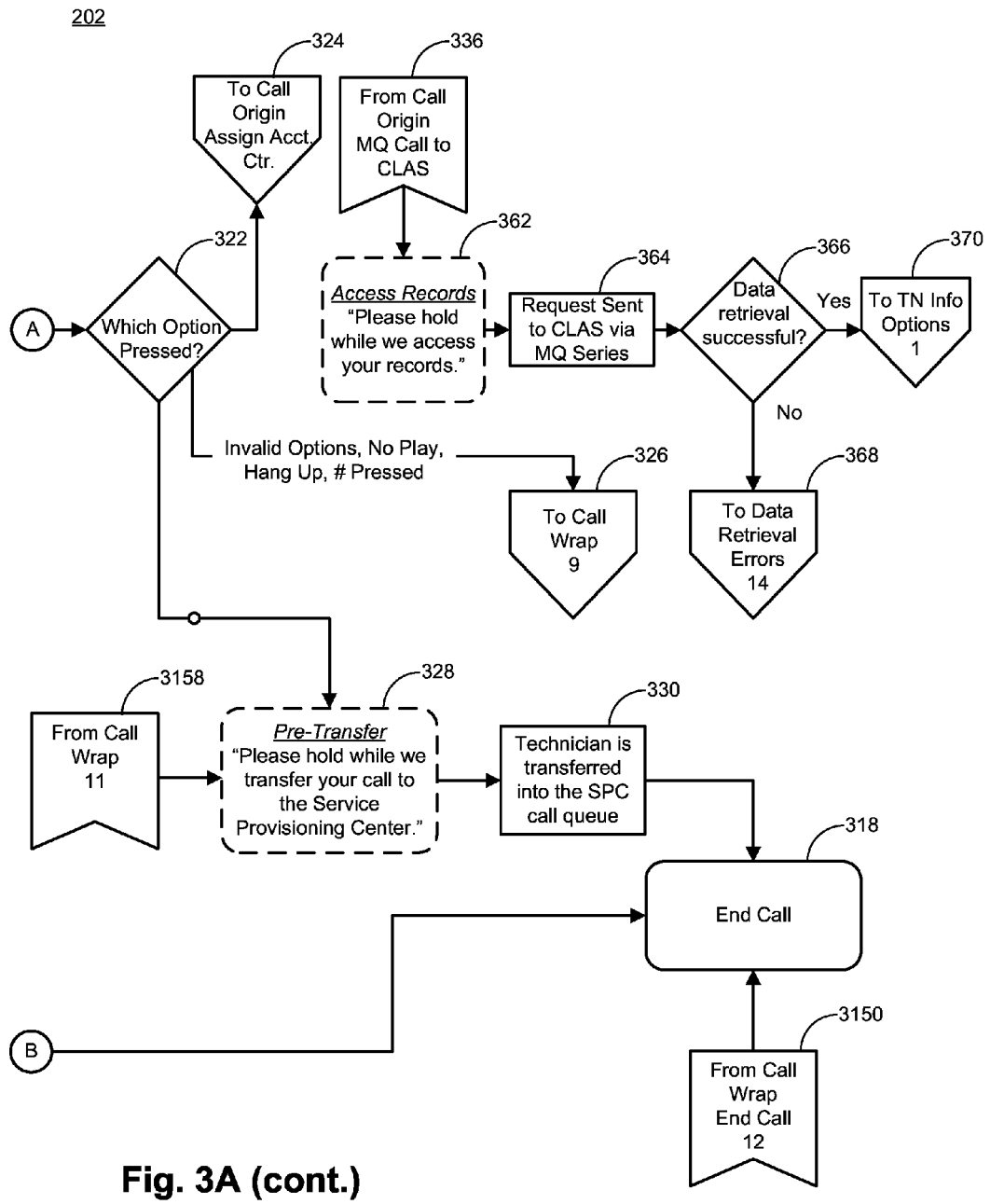
Figure 3B:
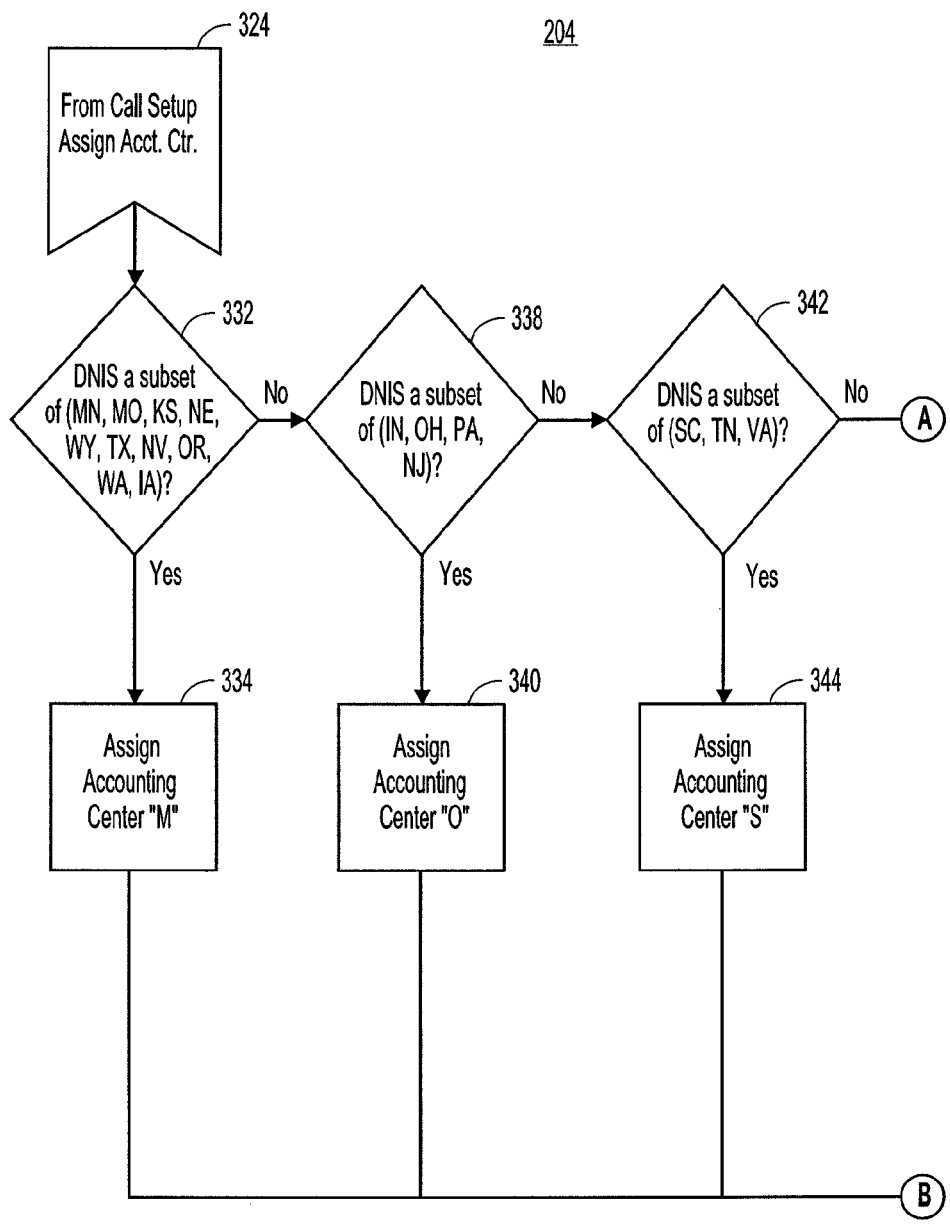
Figure 3B:
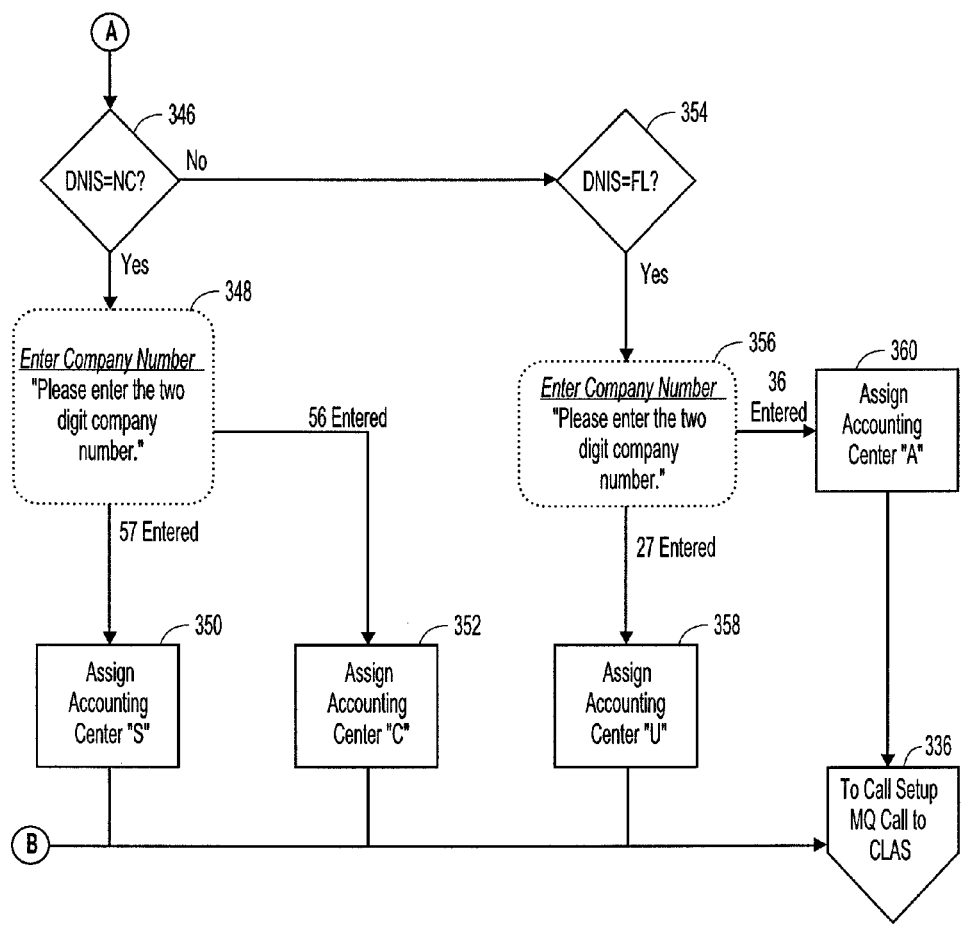

With regard to FIG. 2, software modules 200 that, when executed by the server 118 of FIG. 1, provide for remote access to telephone line assignment information for telephone service technicians using a telephone test set or mobile telephone in accordance with the principles of the present invention. The software modules 200, which may be part of software 124 (FIG. 1), may include a call setup module 202 that is configured to enable a telephone service technician to interact with an IVR system and submit requests for telephone line assignment information to the IVR system, as shown in FIG. 3A. A call origin module 204 may be configured to identify geographic origin of a call from a telephone service technician, as shown in FIG. 3B. A data retrieval errors module 206 may be configured to determine whether or not an error in submitting a data request occurred, as provided in FIG. 3C. A telephone number information options module 208 may be configured to provide selectable telephone number information options to telephone service technicians, as provided in FIG. 3D. A cable, pair, and terminal information module 210 may be configured to determine cable, line pair, and terminal information of a customer telephone line, as provided in FIG. 3E. A line equipment information module 212 may be configured to determine line equipment associated with a customer telephone line for a telephone service technician, as provided in FIG. 3F. An end call module 214 may be configured to end a call from a telephone service technician, as provided in FIG. 3G. It should be understood that additional or alternative software modules may be utilized in providing the functionality in accordance with the principles of the present invention, including IVR software modules that may be executed by an IVR system, such as IVR system 116 of FIG. 1.

With regard to FIG. 3A, a flow diagram of an illustrative software module for providing a call setup is shown. The process starts at step 302, where a network IVR system receives a call. At step 304, a determination as to whether an automatic number identification (ANI) number is received. The ANI number may be a 10 digit number representative of a telephone number, which would be received if a telephone service technician taps onto a telephone line of a customer by using a telephone test set, as understood in the art. If an ANI number is determined to have been received at step 304, then at step 306, the telephone number is read back to the telephone service technician at step 306. If it is determined at step 304 that an ANI number was not received, then the process continues at step 308, where a request for a 10 digit telephone number followed by a "#" is requested.

At step 310, a determination is made as to whether a valid 10 digit telephone number was entered. If so, then the process continues at step 306. Alternatively, if a 10 digit telephone number was not entered, then the process continues at step 312, where a determination is made as to whether more than three retries of entering a valid 10 digit telephone number have been entered by the telephone service technician. If fewer than three telephone number entries have been made, then at step 314, a notification to the telephone service technician that an invalid telephone number has been entered, and an audible request for re-entry of the 10-digit telephone number may be performed at step 314. Otherwise, if more than three attempts to enter a valid 10-digit telephone number have been made, then the process continues at step 316, where an audible statement is made to the telephone service technician that more than three attempts have been made and the process continues at step 318, where the call is ended.

At step 320, an audible notification is presented to the telephone service technician to enter the number "1" for information about the telephone number that was audibly presented to the technician at step 306 or a "#" for information about a different telephone number. In one embodiment, another option may be requested for the telephone service technician to transfer to a call center. At step 322, a determination as to which option the telephone service technician entered may be made. If the telephone service technician entered a "1" indicating that the telephone number presented at step 306 was correct, then the process continues at step 324, which is a call to the call origin module 204, as shown in FIG. 3B. If an invalid option, no play, hang-up, or "#" is selected, then the process continues at step 326 to end the call by the end call module 214, as shown in FIG. 3G. If an option to request a service center is entered by the telephone service technician, such as selection of a "0" option, a notification that the call is being transferred to a service provisioning center or call center played to the telephone service technician at step 328. At step 330, the call from the telephone service technician is transferred into the service provisioning center (SPC) call queue.

With regard to FIG. 3B, in response to the telephone service technician selecting an option to request information of a telephone number at which he or she is currently located, then at step 324, the call origin module 204 begins. At step 332, a determination as to whether the DNIS number is a subset of one of multiple different states (e.g., MN, MO, KS, NE, WY, TX, NV, OR, WA, and IA) that are serviced by a call center of a telecommunication service provider. If the DNIS number is determined to be assigned to one of the states, then the process continues at step 334, where accounting center "M" is assigned to the call. The process continues at step 336, which is part of the call setup module 202 (FIG. 3A). If, at step 332, it is determined that the DNIS number is not within one of the states, then at step 338, a determination is made as to whether the DNIS number is a subset of other states (e.g., IN, OH, PA, NJ). If so, then an accounting center "O" is assigned to the telephone call at step 340, and the process continues at step 336. If, at step 338, the determination is made that the DNIS number is not part of the other states, then at step 342, a determination is made as to whether the DNIS number is a subset of other states (e.g., SC, TN, VA) different from those determined at steps 332 and 338.

If the DNIS number is part of those states being determined at step 342, then an accounting center "S" is assigned to the call at step 344, and the process continues at step 336. If a determination is made at step 342 that the DNIS number is not part of the states, then a determination is made at step 346 whether the DNIS number is still yet located in another state (e.g., NC). If so, then the process continues at step 348, where an audible request is made to the telephone service technician to enter a two digit company number. If the two digit company number is the number "57," then accounting center "S" is assigned to the telephone call at step 350. Otherwise, if the two digit company number is the number "56," then accounting center "C" is assigned to the call at step 352. If the determination at step 346 is made that the DNIS number is not within North Carolina, then at step 354, a determination is made as to whether the DNIS number is within yet another state (e.g., FL). If the determination at step 354 is positive, then the process continues at step 356, where an audible request to the telephone service technician is made to enter a two digit company number. If the two digit company number is the number "27," then at step 358, an accounting center "U" is assigned to the telephone call. Alternatively, if the two digit company number is the number "39," then accounting center "A" is assigned to the call at step 360. The process continues at step 336, which is a call to the call setup module (FIG. 3A). It should be understood that the letters being assigned to the different call centers are illustrative and that other letters or indicia may be utilized for representing accounting centers.

Returning to FIG. 3A, after returning from the call origin module 204 of FIG. 2B at step 336, an audible request to the telephone service technician indicating to please hold while the requested records are being accessed are made at step 362. At step 364, a request is sent to a customer loop assignment system via an MQ Series communications protocol. At step 366, a determination as to whether the data retrieval was successful. If not, then the process continues at step 368, which is part of the data retrieval errors module 206 of FIG. 3C. Alternatively, if the data retrieval was successful, then the process continues at step 370, which is part of the telephone number information options module 208 of FIG. 3B.

Figure 3C:
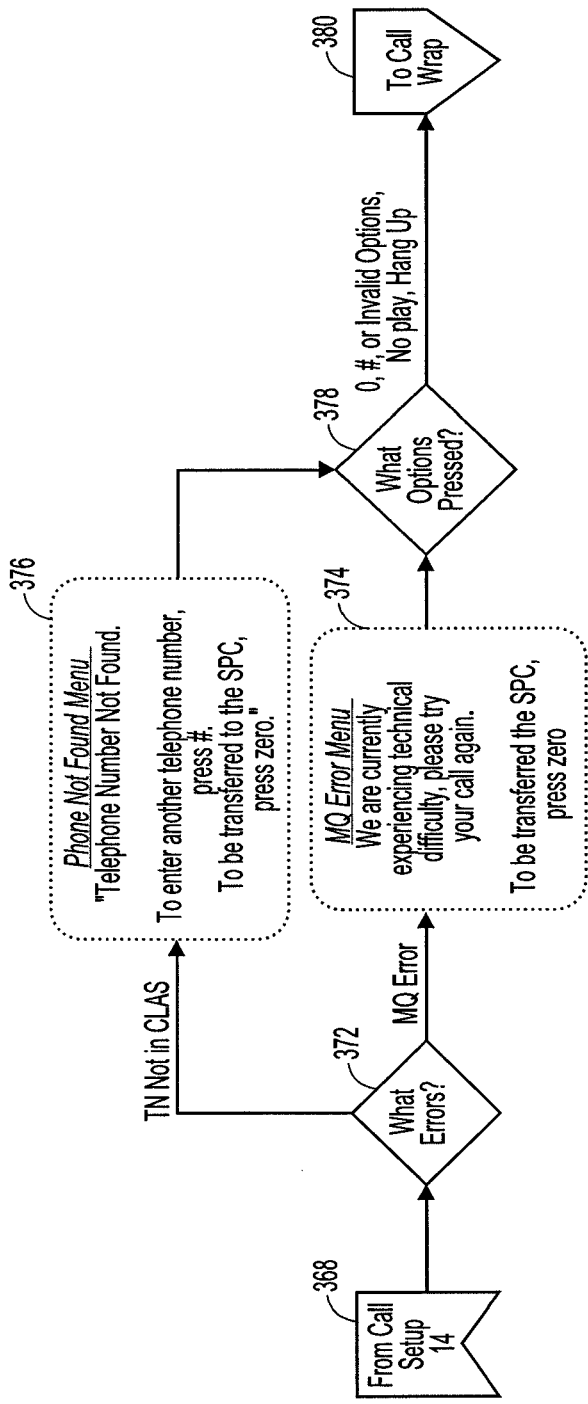

With regard to FIG. 3C, the data retrieval errors module 206 starts at step 368, which is called from the call setup module 202 (FIG. 3A). At step 372, a determination as to what errors exist is made. If the determination is that an MQ error or other communications error exists, then at step 374, an audible statement to the telephone service technician indicating that technical difficulty is currently being experienced with communicating to access the customer loop assignment information, and that the telephone service technician may select option "0" to speak with an agent. If, alternatively, a determination is made at step 372 that the telephone number is not in the customer loop assignment system, then at step 376, an audible message may be played to the telephone service technician that the telephone number was not found and request that another telephone number be entered or that the telephone service technician may select option "0" to speak to an agent at the service provisioning center (SPC). At step 378, a determination as to which option is selected may be performed. The options may include "0," "#," invalid options, no play, or hang up. The process continues at step 380, which is part of the end call module 214 (FIG. 3G).

Figure 3D:
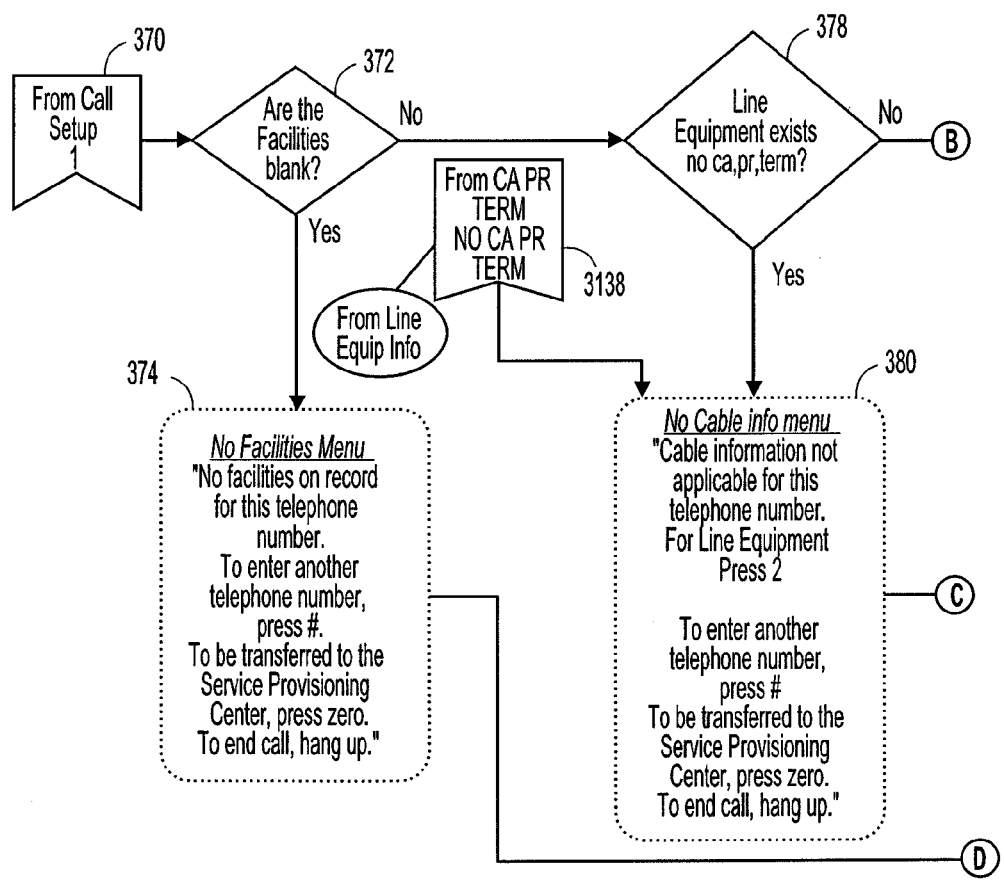
Figure 3D:
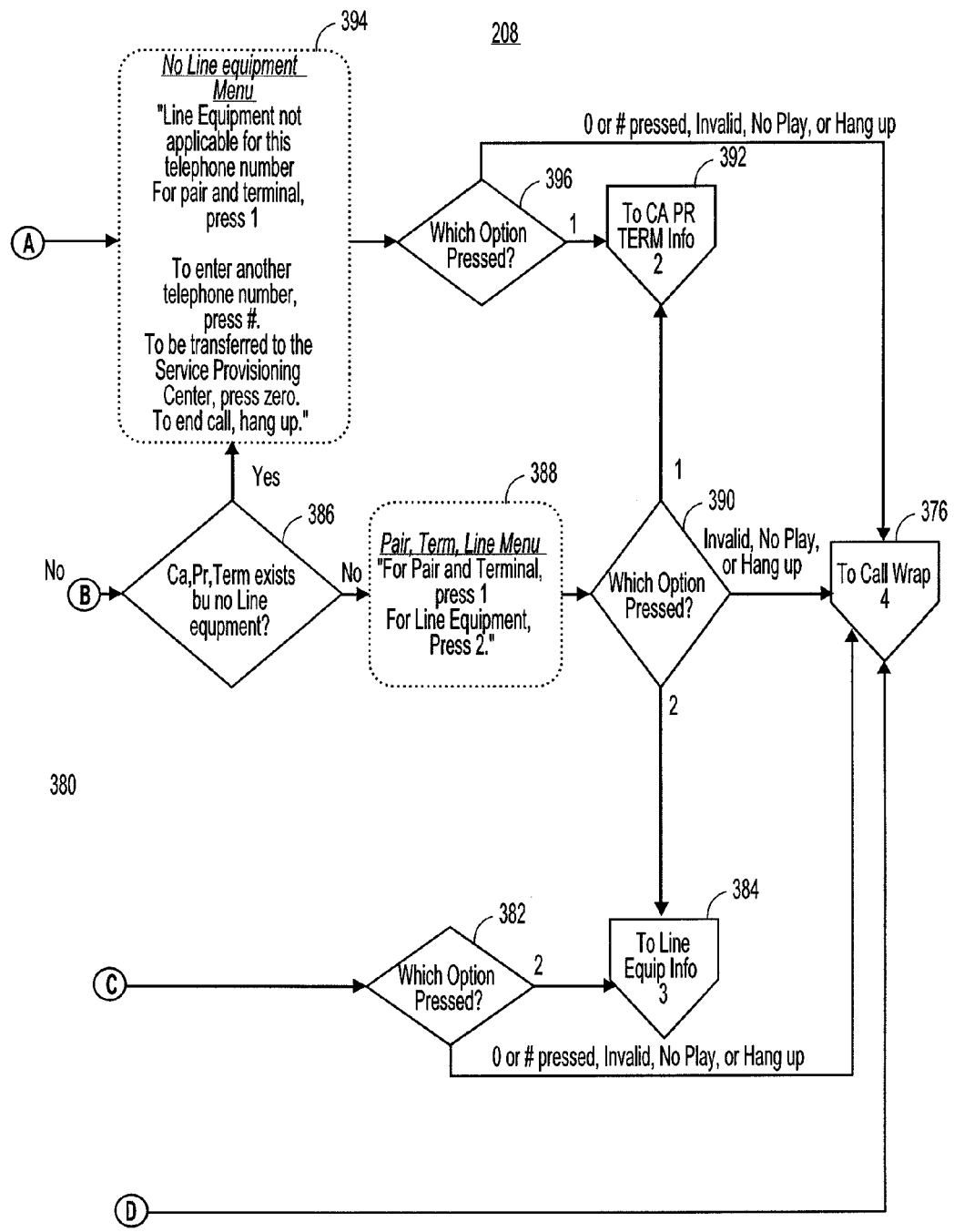
Figure 3E:
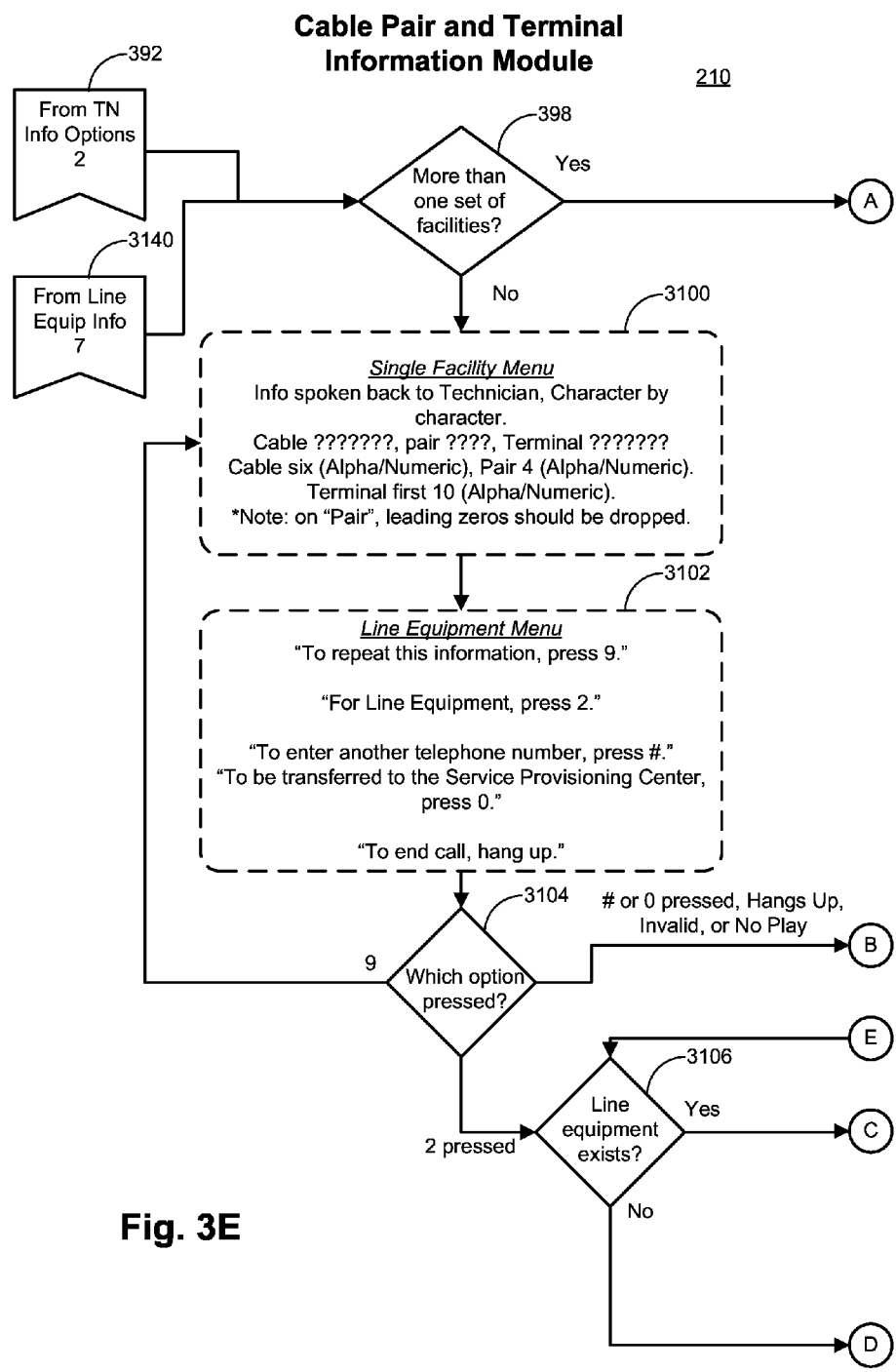
Figure 3E:
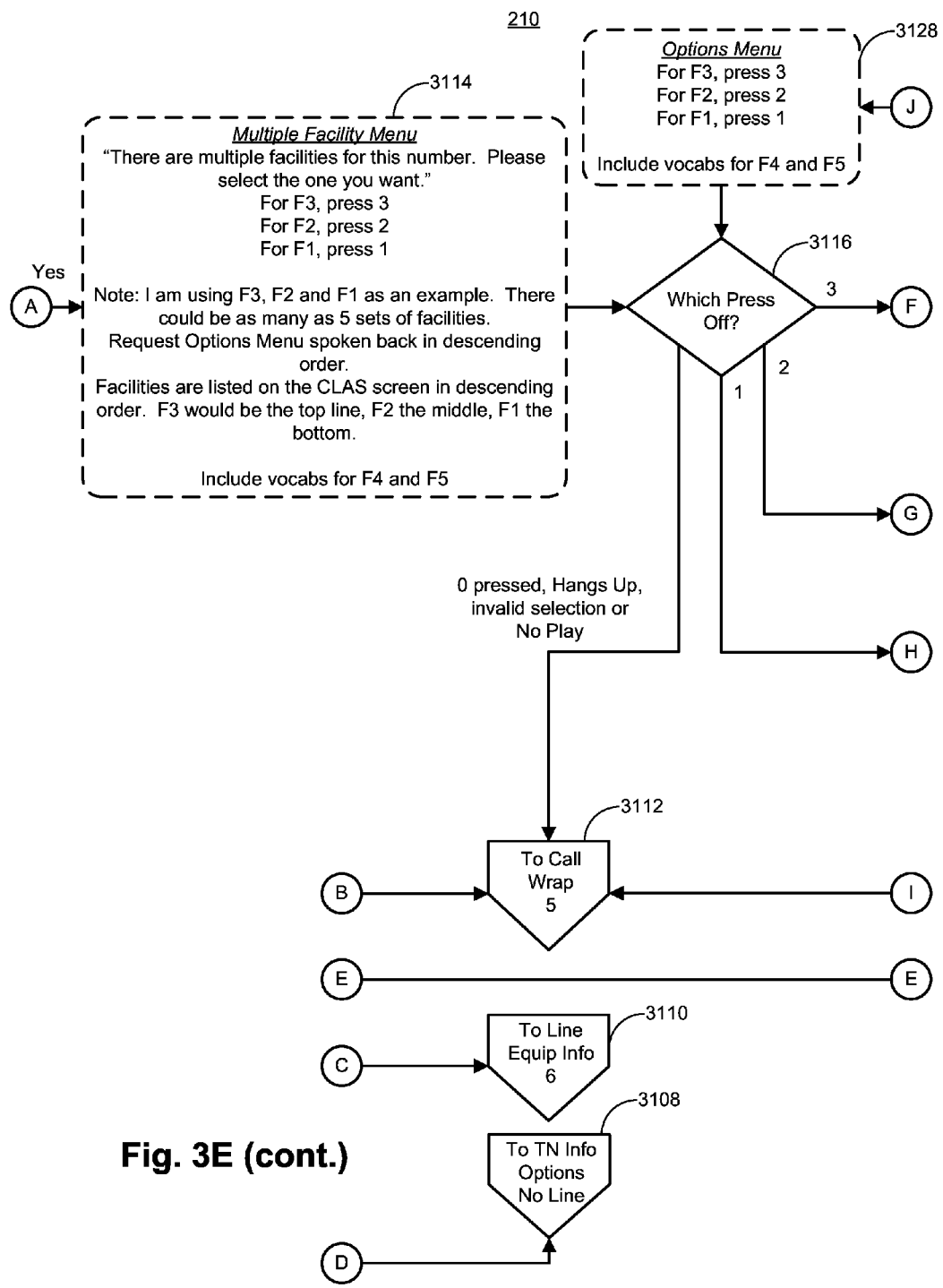
Figure 3E:
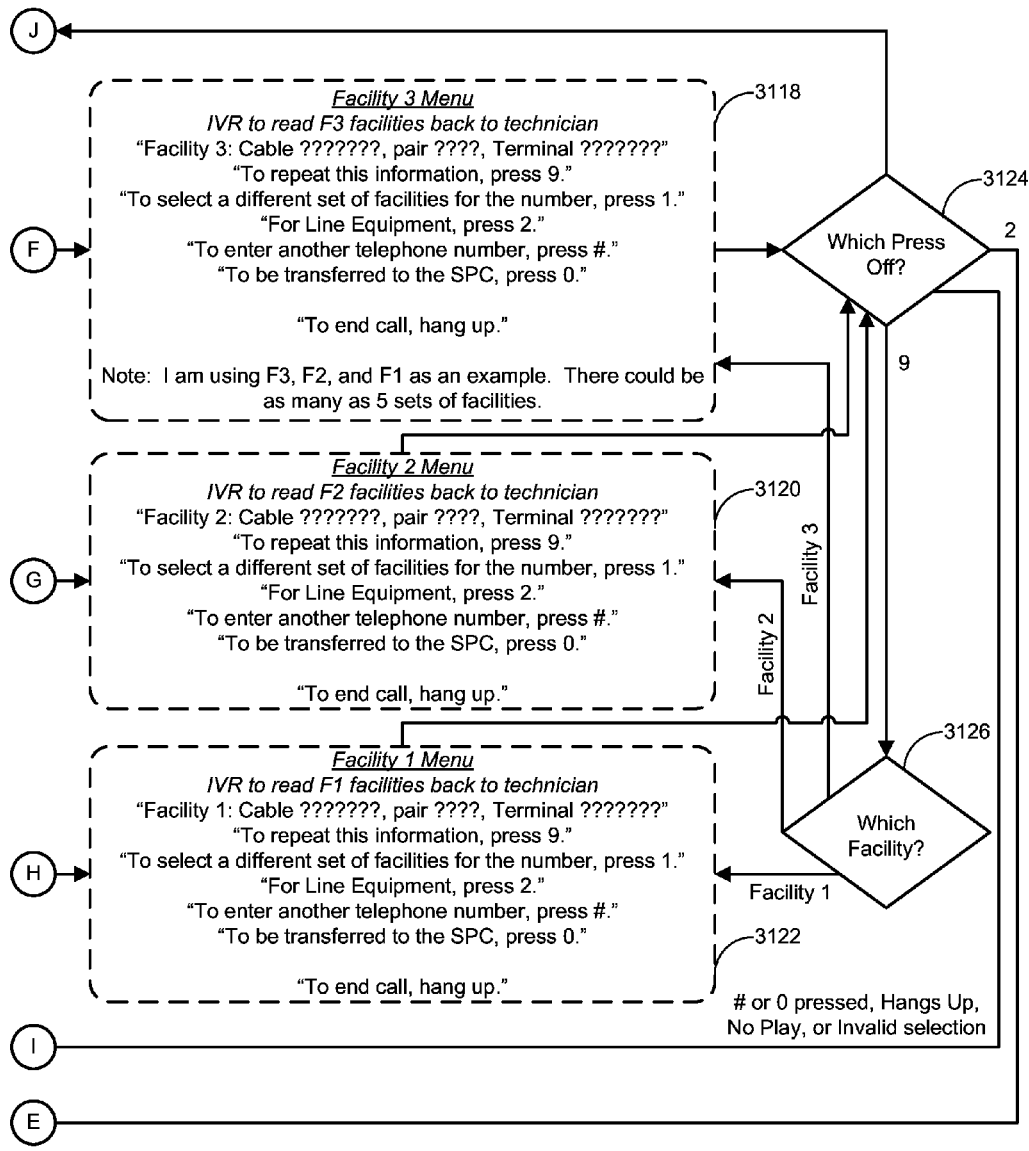
Figure 3F:
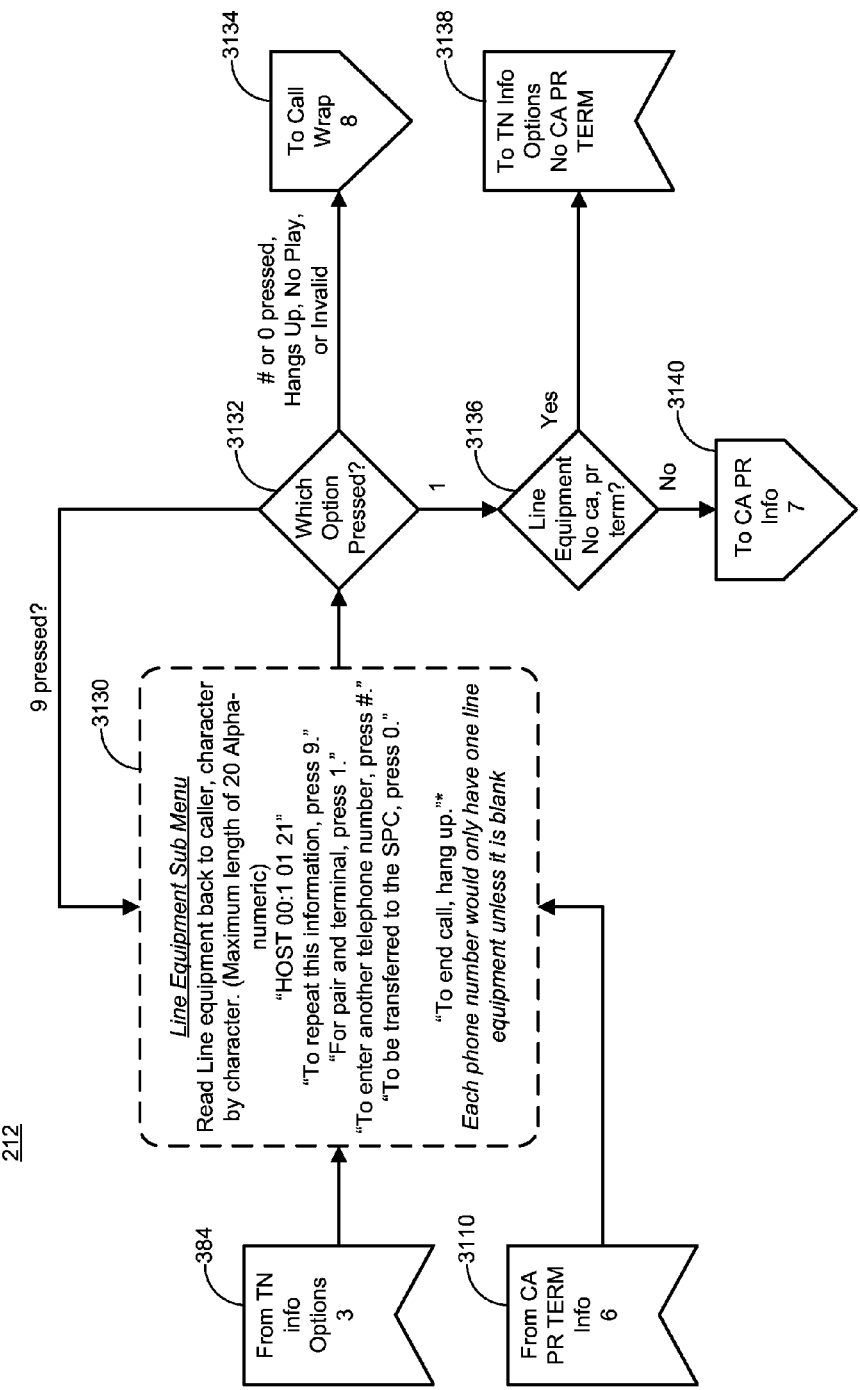
Figure 3G:
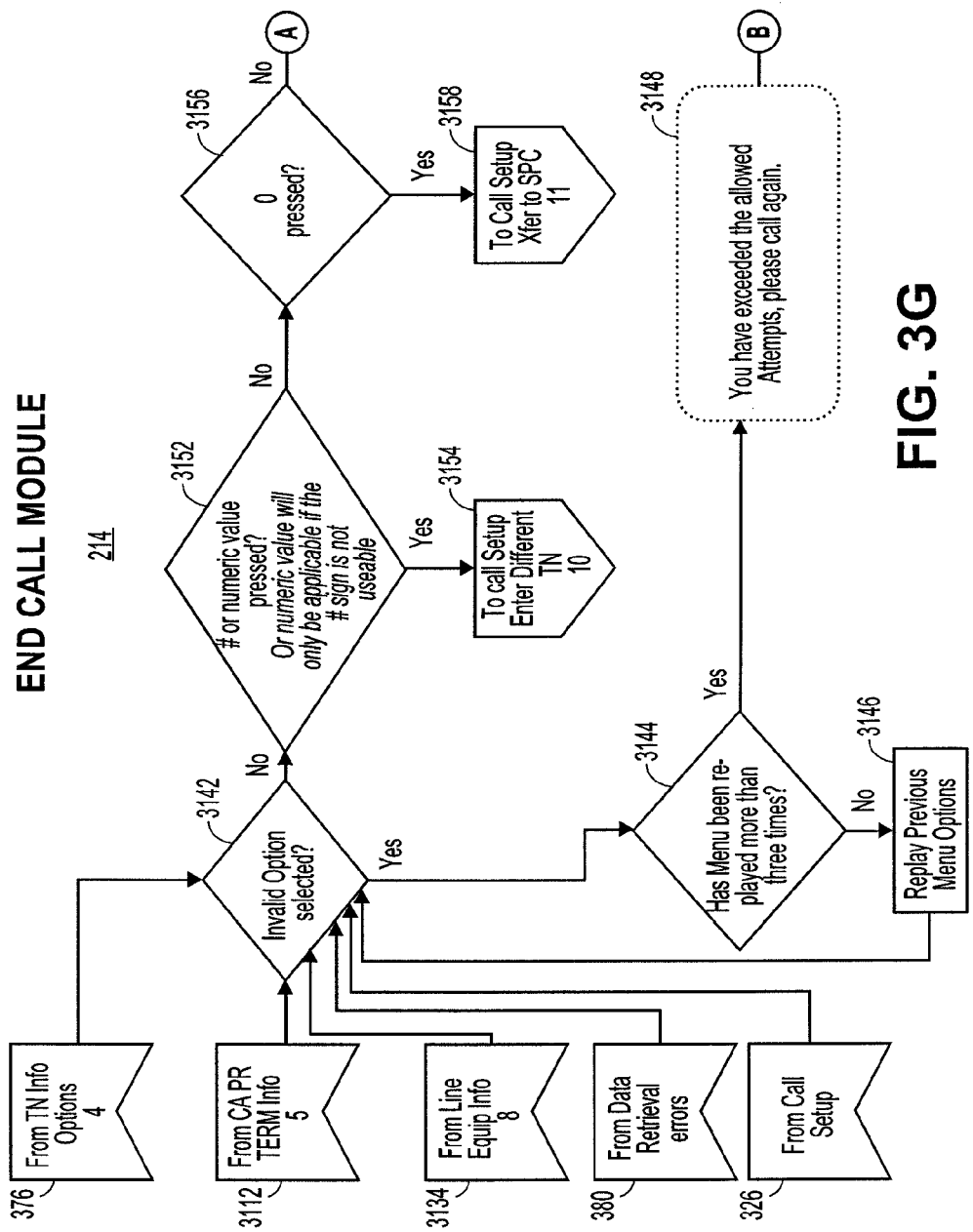
Figure 3G:
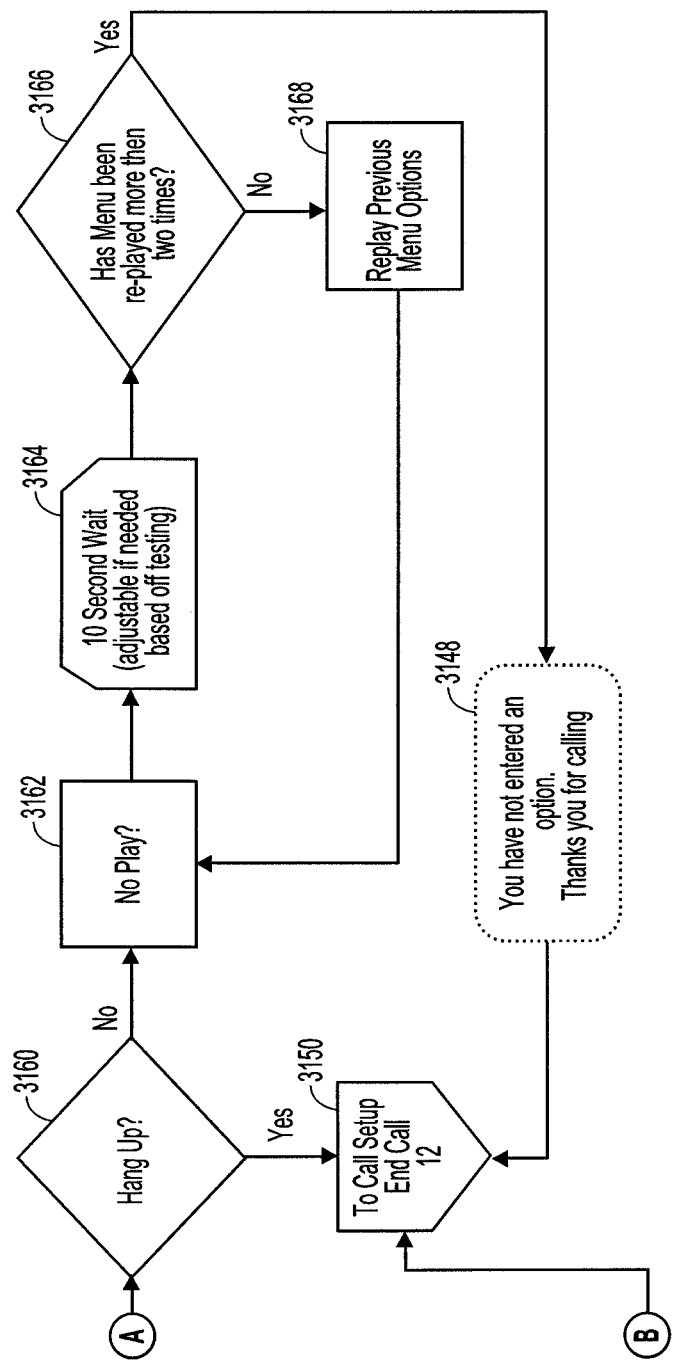

With regard to FIG. 3D, the telephone number information options module 208 starts at step 370, which is called from the call setup module 202 (FIG. 3A). At step 372, a determination as to whether the facilities are blank is made. If so, then an audible message may be played at step 374 to the telephone service technician that "No facilities on record for this telephone number. To enter another telephone number, press #. To be transferred to the service provisioning center, press 0. To end call, hang up." The process continues at step 376, which is a call to the end call module 214 (FIG. 3G). If, at step 372, a determination is made that the facilities are not blank, then at step 378, a determination as to whether line equipment exists, but no cable, pair, and terminal exists, then the process continues at step 380, where an audible communication is made to the telephone service technician, stating "Cable information not applicable for this telephone number. For line equipment press 2. To enter another telephone number, press #. To be transferred to the service provisioning center, press 0. To end call, hang up." The process continues at step 382, which determines which option is selected by the telephone service technician. If option 2 is selected, then the process continues at step 384, which is a call to the line equipment information module 212 (FIG. 3F).

If, at step 378, a determination is made that line equipment exists and includes cable, pair, and terminal, the process continues at step 386, where a determination is made as to whether no line equipment exists. If the determination result is no, then the process continues at step 388, where an audible statement is made to the telephone service technician requesting a response to select an option "For pair and terminal press 1. For line equipment press 2." At step 390, a determination as to which option was selected is made, where if the user selected option 1, the process continues at step 392, which is a call to the cable, pair and terminal information module 210 (FIG. 3E). Alternatively, if the user selected option "2", then the process continues at step 384. If the selection option is invalid, no option is selected, or the telephone service technician hung up, the process continues at step 376.

If at step 386 a determination is made that cable, pair, and terminal exist but no line equipment exists, then the process continues at step 394, where an audible statement is made to the telephone service technician, such as "Line equipment not applicable for this telephone number. For pair and terminal, press 1. To enter another telephone number, press #. To be transferred to the service provisioning center, press 0. To end call, hang up." At step 396, a determination is made as to which option was selected. If option "1" was selected, then the process continues at step 392. Otherwise, if option "0," "#," an invalid option, no option was selected, or the telephone service technician hung up, then the process continues at step 376.

With regard to FIG. 3E, a process representative of the cable, pair, and terminal information module 210 is shown. The process starts at step 392, which is a call from the telephone number information options module 208. At step 398, a determination is made as to whether more than one set of facilities exist for the cable, pair, and terminal information. If only a single facility exists, then the process continues at step 3100, where the IVR communicates an audible message to the telephone service technician character-by-character stating the cable number, pair number, and terminal number. In one embodiment, the cable number is a six-digit alpha-numeric code, the pair number is a four-digit alpha-numeric code, and the terminal is a ten-digit alpha-numeric code, where leading zeros are dropped when communicated (i.e. spoken) to the telephone service technician. The process continues at step 3102, where the IVR communicates selectable options to the telephone service technician, including an option to (i) repeat the telephone line assignment information, (ii) request line equipment information, (iii) enter another telephone number, (iv) be transferred to the service provisioning center, or (v) end the call by hanging up. At step 3104, if the option to repeat the line information is selected, then the process repeats at step 3100. If the option to request line equipment information, then the process continues at step 3106. If, at step 3106, a determination is made that no line equipment exists, then the process continues at step 3108 (FIG. 3D), which is an input into the telephone number information options module 208. If line equipment does exist, then the process continues at step 3110, which is an input in the line equipment information module 212 (FIG. 3F). If, at step 3104, a determination is made that the telephone service technician selected "#," "0," hung up, selected an invalid option, or did not respond, then the process continues at step 3112, which is a call to the end call module 214 (FIG. 3G).

If a determination is made at step 398 that more than one set of facilities exists, then the process continues at step 3114, where audible information is presented to the telephone service technician to select a particular facility that he or she desires as the same telephone number resides at each of the facilities. The process continues at step 3116, where a determination is made as to which facility the telephone service technician selected. If the telephone service technician selected "0," hung up the phone, selected an invalid selection, or did not respond, then the process continues at step 3112 to end the call. If the telephone service technician selected option "3," then the process continues at step 3118, where the IVR plays an audible message to the telephone service technician that indicates facility three, cable number, pair number, and terminal number. Alternatively, if the user selected option "2," then the process continues at step 3120, where the IVR generates an audible message to the telephone service technician indicating facility two, cable number, pair number, and terminal number. Still yet, if the telephone service technician selected option "1," then the IVR plays an audible message to the telephone service technician of the telephone line assignment information indicating facility one, cable number, pair number, and terminal number.

The process continues at step 3124 from any of steps 3118, 3120, or 3122, where a determination is made as to which option is selected by the telephone service technician. If option "9," is selected, then the process continues at step 3126, where a determination is made as to which facility the telephone service technician selected and the process returns to step 3118, 3120, or 3122 depending upon the facility that the telephone service technician selected at step 3114. If the telephone service technician selected option "1," then the process continues at step 3128, where the telephone service technician is presented with an audible message requesting selection of a different facility. It should be understood that facilities 1-3 are illustrative in that more or fewer facilities may be utilized in accordance with the principles of the present invention. The process continues at step 3116.

The line equipment information module 212 is shown in FIG. 3F. The line equipment information module 212 may be called from the telephone number information options module 208 (FIG. 3B) at step 384 or the cable, pair, and terminal information module 210 (FIG. 3E) at step 3110. At step 3130, the IVR may play an audible message to the telephone service technician that states the line equipment information to the telephone service technician character-by-character (e.g., host 00 1 01 21). A number of options may also be played to the telephone service technician. At step 3132, a determination as to which option is selected may be made. If the telephone service technician selected option "9," then the process repeats step 3130 and reads the line equipment back to the telephone service technician. Alternatively, if the telephone service technician selected option "#," "0," hung up, does not select an option, or selects an invalid option, then the process continues at step 3134, which is a call to the end call module 214 (FIG. 3G). Alternatively, if option "1" is selected, then the process continues at step 3136, where a determination as to whether pair and terminal information is requested. If so, then the process continues at step 3138, which is a call to the telephone number information options module 208 (FIG. 3B). Alternatively, if the determination at step 3136 is that no pair and terminal information is desired by the telephone service technician, then the process continues at step 3140, which is a call to the cable, pair, and terminal information module 210 (FIG. 3E).

With regard to FIG. 3G, the end of call module 214 is shown. As shown, the end of call module 214 may be called from five other modules at steps (i) 376 (telephone number information options module 208 (FIG. 3D)), (ii) 3112 (cable, pair, and terminal information module 210 (FIG. 3E)), (iii) 3134 (line equipment information module 212 (FIG. 3F)), (iv) 368 (date of retrieval errors module 206 (FIG. 3C)), and (v) 326 (call origin module 204 (FIG. 3B)). At step 3142, a determination is made as to whether an invalid option was selected. If so, then the process continues at step 3144, where a determination is made as to whether the menu (i.e., audible message) has been played more than three times. If not, then the process continues at step 3146, where the IVR replays the previous menu options, and the process repeats step 3142. If a determination is made at step 3144 that the menu has been replayed more than three times, then the process continues at step 3148, where the IVR communicates an audible message to the telephone service technician that "You have exceeded the allowed attempts, please call again." At step 3150, the call is ended.

If at step 3142 a determination is made that an invalid option was not selected, then the process continues at step 3152, where a determination is made as to whether the "#" or numeric value was selected. If so, then the process continues at step 3154, which is a call to the call setup module 202 (FIG. 3A) to enter a different telephone number. Alternatively, if a determination is made at step 3152 that neither the "#" or numeric value other than "0" was pressed, then the process continues at step 3156, where a determination is made as to whether a "0" was pressed. If so, then the process continues at step 3158, where a call to the call setup module 202 (FIG. 3A) for transfer to the service provisioning center at step 328 (FIG. 3A). If a determination is made at step 3156 that a "0" was not selected, then the process continues at step 3160, where a determination is made as to whether the telephone service technician hung up the phone. If so, then the process continues at step 3150, which is a call to the call setup module 202 (FIG. 3A) to end the call. Alternatively, if the determination at step 3160 is made that the telephone was not hung up, then the process continues at step 3162, where a determination is made that no selection has been made. If so, then the process continues at step 3164, where a 10-second wait may be made to wait for the telephone service technician to respond to an option selection request. At step 3166, a determination may be made as to whether the menu has been replayed more than two times. If not, then the process continues at step 3168, where the IVR may replay the menu again. Alternatively, if the menu has been replayed more than two times, then the process continues at step 3170, where the IVR may play a message indicating that the telephone service technician has not selected an option, and the process continues at step 3150, which calls the call setup module 202 (FIG. 3A) to end the call at step 318.

Figure 4:
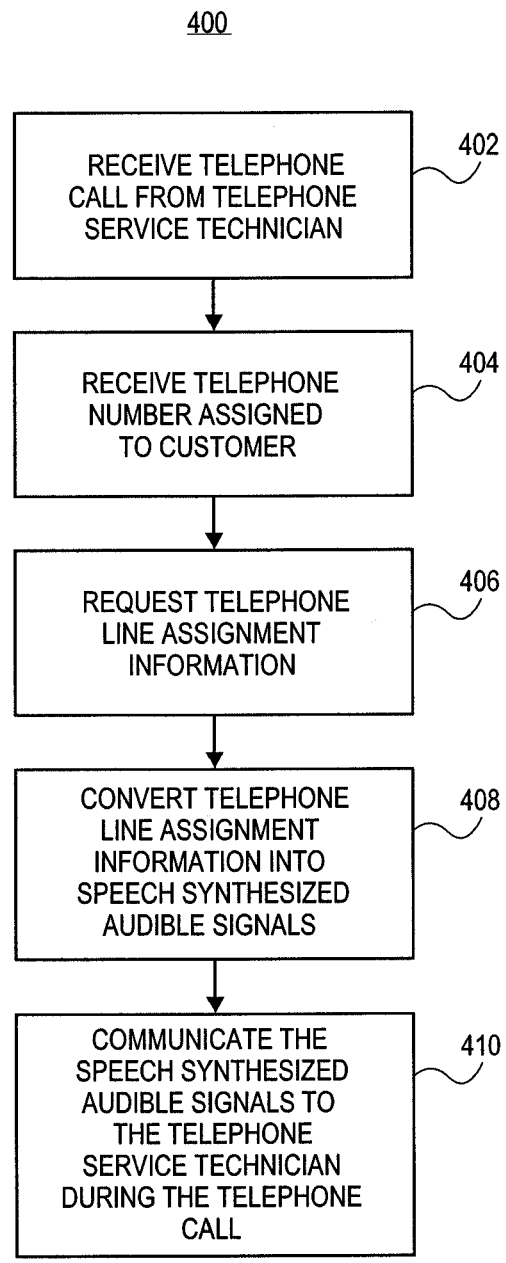
FIG. 4 is a flow diagram of an illustrative process for providing telephone service technicians with access to telephone line assignment information via an IVR in accordance with the principles of the present invention.

With regard to FIG. 4, an illustrative process for telephone service technicians to retrieve telephone line assignment information is provided. The process 400 starts at step 402, where a telephone call is received from a telephone service technician. At step 404, a telephone number assigned to a customer of a communications carrier may be received. In one embodiment, the telephone number is associated with a telephone operating on a public switched telephone network (PSTN). At step 406, telephone line assignment information may be requested, where the telephone line assignment information includes cable and line pair information. The telephone line assignment information may be converted into speech synthesized audible signals at step 408, and at step 410, the telephone line assignment information may be communicated to the telephone service technician during the telephone call. The conversion of the telephone line assignment information may be performed by an interactive voice response system that is called by another network node or operating at the same network node. In one embodiment, a text message or email may be generated to include the telephone line assignment information and communicated to the telephone service technician via a wireless telecommunications network.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A method for telephone service technicians to retrieve telephone line assignment information, said method comprising:
    receiving a telephone call from a telephone service technician providing trouble shooting service for an existing customer of a communication carrier;
    receiving a telephone number assigned to the existing customer, the telephone number associated with a telephone operating on a wired communications network;
    requesting telephone line assignment information, the telephone line assignment information including cable and line pair information;
    converting the telephone line assignment information into speech synthesized audible signals; and
    communicating the speech synthesized audible signals to the telephone service technician during the telephone call.

2. The method according to claim 1, wherein the telephone is operating on the public switched telephone network (PSTN), and wherein receiving the telephone number includes receiving a dialed number information service (DNIS) number from a pair of telephone lines to which the telephone service technician connected a telephone test set.

3. The method according to claim 1, further comprising:
    determining that an automatic number identification (ANI) is not received;
    requesting a telephone number input from the telephone service technician; and
    wherein receiving a telephone number input includes receiving audible signals representative of the telephone number that the telephone service technician is servicing.

4. The method according to claim 1, wherein telephone line assignment information further includes terminal information.

5. The method according to claim 1, wherein converting and communicating is performed by an interactive voice response system.

6. The method according to claim 1, wherein requesting telephone line assignment information includes requesting telephone line assignment information from a customer loop assignment system.

7. The method according to claim 1, further comprising correcting the telephone line assignment information in response to the telephone service technician determining that the telephone is connected to a different cable and line pair.

8. The method according to claim 1, further comprising:
    determining a geographic region in which the telephone resides;
    determining a network address of a server from among a plurality of servers configured to store telephone line assignment information in different geographic regions; and
    wherein requesting the telephone line assignment information includes requesting the telephone line assignment information based on the telephone number.

9. The method according to claim 1, further comprising prompting the telephone service technician with audible questions to determine what particular telephone line assignment information is desired by the telephone service technician.

10. The method according to claim 1, further comprising enabling the telephone service technician to enter a second telephone number to request second telephone line assignment information.

11. A system for telephone service technicians to retrieve telephone line assignment information, said system comprising:
    a memory for storing information;
    an input/output (I/O) unit configured to communicate information over a network;
    a processing unit in communication with said memory and I/O unit, said processing unit configured to:
        receive a telephone call from a telephone service technician providing trouble shooting service for an existing customer of a communication carrier;
        receive a telephone number assigned to the existing customer, the telephone number associated with a telephone operating on a wired communications network;

request telephone line assignment information, the telephone line assignment information including cable and line pair information;

cause conversion of the telephone line assignment information into speech synthesized audible signals; and cause communication of the speech synthesized audible signals to the telephone service technician during the telephone call.

12. The system according to claim 11, wherein the telephone is operating on the PSTN, and wherein the telephone number is received as a dialed number information service (DNIS) number from a pair of telephone lines to which the telephone service technician connected a telephone test set.

13. The system according to claim 11, wherein said processing unit is further configured to:

determine that an automatic number identification (ANI) is not received;

request a telephone number input from the telephone service technician; and wherein a telephone number input includes audible signals representative of the telephone number that the telephone service technician is servicing.

14. The system according to claim 11, wherein telephone line assignment information further includes terminal information.

15. The system according to claim 11, wherein causing conversion and communication is performed by said processing unit by communicating with an interactive voice response system.

16. The system according to claim 11, wherein the request of telephone line assignment information is a request to a customer loop assignment system.

17. The system according to claim 11, wherein said processing unit is further configured to correct the telephone line assignment information in response to the telephone service technician determining that the telephone is connected to a different cable and line pair.

18. The system according to claim 11, wherein said processing unit is further configured to:

determine a geographic region in which the telephone resides;

determine a network address of a server from among a plurality of servers configured to store telephone line assignment information in different geographic regions; and wherein the request of the telephone line assignment information includes requesting the telephone line assignment information based on the telephone number.

19. The system according to claim 11, wherein said processing unit is further configured to prompt the telephone service technician with audible questions to determine what particular telephone line assignment information is desired by the telephone service technician.

20. The system according to claim 11, wherein said processing unit is further configured to enable the telephone service technician to enter a second telephone number to request second telephone line assignment information.

\* \* \* \* \*